US011368739B2

(12) United States Patent
Du et al.

(10) Patent No.: US 11,368,739 B2
(45) Date of Patent: Jun. 21, 2022

(54) METHOD AND APPARATUS FOR INPUTTING INFORMATION ON DISPLAY INTERFACE, AND STORAGE MEDIUM

(71) Applicant: BEIJING XIAOMI MOBILE SOFTWARE CO., LTD., Beijing (CN)

(72) Inventors: Xutao Du, Beijing (CN); Ming Liu, Beijing (CN); Yijing Liao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/213,206

(22) Filed: Mar. 25, 2021

(65) Prior Publication Data

US 2021/0329329 A1  Oct. 21, 2021

(30) Foreign Application Priority Data

Apr. 15, 2020  (CN) .......................... 202010294349.6

(51) Int. Cl.
*H04N 21/422* (2011.01)
*H04N 21/4363* (2011.01)

(52) U.S. Cl.
CPC ... *H04N 21/4222* (2013.01); *H04N 21/43637* (2013.01)

(58) Field of Classification Search
CPC ..................... H04N 21/4222; H04N 21/43637
See application file for complete search history.

(56) References Cited

U.S. PATENT DOCUMENTS

| 2008/0141313 | A1* | 6/2008 | Kato | H04N 21/2347 725/62 |
| 2012/0150601 | A1* | 6/2012 | Fisher | G06Q 20/4014 705/14.23 |
| 2012/0210364 | A1* | 8/2012 | Lee | H04W 12/50 725/51 |

(Continued)

FOREIGN PATENT DOCUMENTS

| CN | 102769724 A | 11/2012 |
| CN | 103167338 A | 6/2013 |

(Continued)

OTHER PUBLICATIONS

Extended European search report (EESR) in EP 21165539.4 dated Sep. 10, 2021.

*Primary Examiner* — Fernando Alcon
(74) *Attorney, Agent, or Firm* — Syncoda LLC; Feng Ma

(57) ABSTRACT

A method for inputting information on a display interface can be applied to a smart TV, and include: sending, in response to a need to input information in the display interface of the smart TV, indication information to a mobile terminal including a near field communication component, through a device associated with the smart TV and including a near field communication function circuit, the indication information being used to indicate that information needs to be input in the display interface; and acquiring information sent by the mobile terminal, and inputting the information in the display interface. The information to be input in the display interface of the smart TV can be input to the smart TV through the mobile terminal, thereby improving user experience.

19 Claims, 4 Drawing Sheets

(56) References Cited

U.S. PATENT DOCUMENTS

| | | | |
|---|---|---|---|
| 2012/0236820 A1* | 9/2012 | Park | H04B 5/0031 |
| | | | 370/331 |
| 2013/0234959 A1* | 9/2013 | Yoo | G06F 3/0416 |
| | | | 345/173 |
| 2014/0157339 A1* | 6/2014 | Zhang | H04N 21/4622 |
| | | | 725/110 |
| 2014/0256254 A1* | 9/2014 | Sarda | H04B 5/0031 |
| | | | 455/41.1 |
| 2014/0256255 A1* | 9/2014 | Thomas | H04N 21/41407 |
| | | | 455/41.1 |
| 2014/0259061 A1* | 9/2014 | Delpuch | H04N 21/4627 |
| | | | 725/37 |
| 2016/0301229 A1* | 10/2016 | Chao | H02J 7/00 |
| 2016/0373693 A1* | 12/2016 | Segal | H04N 21/47 |
| 2017/0048590 A1* | 2/2017 | Chen | H04N 21/42204 |
| 2017/0126831 A1* | 5/2017 | Prakash | H04W 84/12 |
| 2017/0228040 A1 | 8/2017 | Papstein | |

FOREIGN PATENT DOCUMENTS

| | | |
|---|---|---|
| CN | 207995292 U | 10/2018 |
| WO | 2019236356 A1 | 12/2019 |

* cited by examiner

METHOD AND APPARATUS FOR INPUTTING INFORMATION ON DISPLAY INTERFACE, AND STORAGE MEDIUM

CROSS-REFERENCE TO RELATED APPLICATION

This disclosure claims priority to Chinese Patent Application No. 202010294349.6 filed on Apr. 15, 2020, the disclosure of which is hereby incorporated by reference in its entirety.

BACKGROUND

With the development of smart TVs, users can transmit pictures and sounds from mobile terminals to TVs. Such mobile terminals can include smart phones, tablet computers, etc.

SUMMARY

The present disclosure generally relates to the field of smart homes, and more specifically to a method and apparatus for inputting information on a display interface, and a storage medium.

According to a first aspect of embodiments of the present disclosure, there is provided a method for inputting information on a display interface, the method for inputting information on the display interface is applied to a smart TV, and comprises: sending, in response to a need to input information on the display interface of the smart TV, indication information to a mobile terminal including a near field communication component, through a device associated with the smart TV and including a near field communication function circuit, the indication information being used to indicate that information needs to be input into the display interface; and acquiring information sent by the mobile terminal, and inputting the information into the display interface.

In some embodiments, prior to sending the indication information to the mobile terminal including a near field communication component, the method further includes: displaying, on the display interface of the smart TV, prompt information for prompting a connection between the smart TV and the mobile terminal.

In some embodiments, the sending indication information to a mobile terminal including a near field communication component includes: sending the indication information to the mobile terminal including the near field communication component, when a near field communication connection between the device including the near field communication function circuit and the mobile terminal is established in a touch mode.

In some embodiments, the indication information includes at least one of login account information and wireless distribution network information that needs to be input in the display interface.

In some embodiments, the indication information is further used to indicate to actuate a keyboard of the mobile terminal and to indicate to connect the mobile terminal and the smart TV.

In some embodiments, the acquiring information sent by the mobile terminal includes: acquiring the information sent by the mobile terminal through the near field communication function circuit of the device including the near field communication function circuit, when a connection between the near field communication function circuit and the mobile terminal is established in a touch mode.

In some embodiments, the acquiring information sent by the mobile terminal includes: inputting and acquiring the information sent by the mobile terminal, through the keyboard, when a connection between the keyboard and the smart TV is established in a wireless communication manner.

In some embodiments, the device including the near field communication function circuit includes a TV remote control.

According to a second aspect of the embodiments of the present disclosure, there is provided a method for inputting information on a display interface, the method for inputting information on the display interface is applied to a mobile terminal including a near field communication component, and comprises: receiving indication information sent by a device including a near field communication function circuit, the device including the near field communication function circuit being associated with a smart TV, and the indication information being used to indicate that information needs to be input in a display interface of the smart TV; and determining and sending the information to be input in the display interface of the smart TV to the smart TV, based on the indication information.

In some embodiments, the indication information is used to indicate that login account information and/or wireless distribution network information need to be input in the display interface; and the determining the information to be input in the display interface of the smart TV comprises: determining, when the login account information and/or the wireless distribution network information are stored in the mobile terminal, the stored login account information and/or wireless distribution network information as the information to be input in the display interface of the smart TV.

In some embodiments, the determining the information to be input in the display interface of the smart TV comprises: actuating, when the login account information is not stored in the mobile terminal, an operation interface of the login account information of the mobile terminal, and determining the information input by a user to the operation interface of the login account information as the information to be input in the display interface of the smart TV; and/or, actuating, when the wireless distribution network information is not stored in the mobile terminal, the operation interface of the wireless distribution network information of the mobile terminal, and determining the information input by the user in the operation interface of the wireless distribution network information as the information to be input in the display interface of the smart TV.

In some embodiments, the indication information is further used to indicate to actuate a keyboard of the mobile terminal and to indicate to connect the mobile terminal and the smart TV; and the determining the information to be input in the display interface of the smart TV comprises: actuating the keyboard, based on the indication information; and determining the information input by the user through the keyboard as the information to be input in the display interface of the smart TV.

In some embodiments, the sending the information to be input to the smart TV comprises: sending, when a near field communication connection between the near field communication function circuit and the mobile terminal is established in a touch mode, the information to be input to the smart TV, by the mobile terminal, through the device including the near field communication function circuit.

In some embodiments, the sending the information to be input to the smart TV comprises: sending, when a connection between the keyboard and the smart TV is established in a wireless communication manner, the information input by the user through the keyboard to the smart TV in a wireless communication manner.

According to a third aspect of the embodiments of the present disclosure, there is provided an apparatus for inputting information on a display interface, the apparatus for inputting information on the display interface is applied to a smart TV and comprises: a sending unit configured to send, in response to a need to input information on the display interface of the smart TV, indication information to a mobile terminal including a near field communication component, through a device associated with the smart TV and including a near field communication function circuit, the indication information being used to indicate that information needs to be input in the display interface; and an acquiring unit configured to acquire information sent by the mobile terminal, and input the information in the display interface.

In some embodiments, the apparatus further comprises a prompting unit; and the prompting unit is configured to, prior to sending the indication information to the mobile terminal including the near field communication component, display prompt information for prompting a connection between the smart TV and the mobile terminal, on the display interface of the smart TV.

In some embodiments, the sending unit is configured to send the indication information to the mobile terminal including the near field communication component in the following manner: sending the indication information to the mobile terminal including the near field communication component, when a near field communication connection between the device including the near field communication function circuit and the mobile terminal is established in a touch mode.

In some embodiments, the indication information is used to indicate that at least one of login account information and wireless distribution network information needs to be input in the display interface.

In some embodiments, the indication information is further used to indicate to actuate a keyboard of the mobile terminal and to indicate to connect the mobile terminal and the smart TV.

In some embodiments, the acquiring unit is configured to acquire the information sent by the mobile terminal in the following manner: acquiring the information sent by the mobile terminal through the near field communication function circuit of the device, when a connection between the near field communication function circuit and the mobile terminal is established in a touch mode.

In some embodiments, the acquiring unit is configured to acquire the information sent by the mobile terminal in the following manner: acquiring the information sent by the mobile terminal, when a connection between the keyboard and the smart TV is established in a wireless communication manner.

In some embodiments, the device including the near field communication function circuit comprises a TV remote control.

According to a fourth aspect of the present disclosure, there is provided an apparatus for inputting information on a display interface, the apparatus for inputting information on the display interface is applied to a mobile terminal including a near field communication component and comprises: a receiving unit configured to receive indication information sent by a device including the near field communication function circuit, the device including the near field communication function circuit being associated with a smart TV, and the indication information being used to indicate that information needs to be input in a display interface of the smart TV; and a determining unit configured to determine the information to be input in the display interface of the smart TV to the smart TV, based on the indication information; and a sending unit configured to send the information to be input in the display interface of the smart TV to the smart TV.

In some embodiments, the indication information is used to indicate that login account information and/or wireless distribution network information need to be input in the display interface; and the determining unit is configured to determine the information to be input in the display interface of the smart TV in the following manner: determining, when the login account information and/or the wireless distribution network information are stored in the mobile terminal, the stored login account information and/or wireless distribution network information as the information to be input in the display interface of the smart TV.

In some embodiments, the determining unit is configured to determine the information to be input in the display interface of the smart TV in the following manner: actuating, when the login account information is not stored in the mobile terminal, an operation interface of the login account information of the mobile terminal, and determining information input by a user to the operation interface of the login account information as the information to be input in the display interface of the smart TV; and/or, actuating, when the wireless distribution network information is not stored by the mobile terminal, the operation interface of the wireless distribution network information of the mobile terminal, and determining the information input by the user to the operation interface of the wireless distribution network information as the information to be input in the display interface of the smart TV.

In some embodiments, the indication information is further used to indicate to actuate a keyboard of the mobile terminal and to indicate to connect the mobile terminal and the smart TV; and the determining unit is configured to determine the information to be input in the display interface of the smart TV in the following manner: actuating the keyboard, based on the indication information; and determining the information input by the user through the keyboard as the information to be input in the display interface of the smart TV.

In some embodiments, the sending unit is configured to send the information to be input to the smart TV in the following manner: sending, when a near field communication connection between the near field communication function circuit and the mobile terminal is established in a touch mode, the information to be input to the smart TV, by the mobile terminal, through the device including the near field communication function circuit.

In some embodiments, the sending unit is configured to send the information to be input to the smart TV in the following manner: when a connection between the keyboard and the smart TV is established in a wireless communication manner, sending the information input by the user through the keyboard to the smart TV in a wireless communication manner.

According to a fifth aspect of the present disclosure, there is provided an apparatus for inputting information on a display interface, and the apparatus for inputting information on the display interface comprises a memory configured to store instructions, and a processor configured to invoke the instructions to execute the method for inputting information on the display interface according to the foregoing first aspect or any one of the examples of the first aspect.

According to a sixth aspect of the present disclosure, there is provided a non-transitory computer-readable storage medium having stored thereon computer-executable instructions that, when executed by a processor, execute the method for inputting information on the display interface according to the foregoing first aspect or any one of the examples of the first aspect.

According to a seventh aspect of the present disclosure, there is provided an apparatus for inputting information on a display interface, and the apparatus for inputting information on the display interface includes a memory configured to store instructions, and a processor configured to invoke the instructions to execute the method for inputting information on the display interface according to the foregoing second aspect or any one of the examples of the second aspect.

According to an eighth aspect of the present disclosure, there is provided a non-transitory computer-readable storage medium having stored thereon computer-executable instructions that, when executed by a processor, execute the method for inputting information on the display interface according to the foregoing second aspect or any one of the examples of the second aspect.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

When information needs to be inputted into TVs, it may be necessary to choose letters one by one through a remote control and input the selected letters one by one into the input box, which is not convenient for operation, and the user experience is poor.

Figure 1:
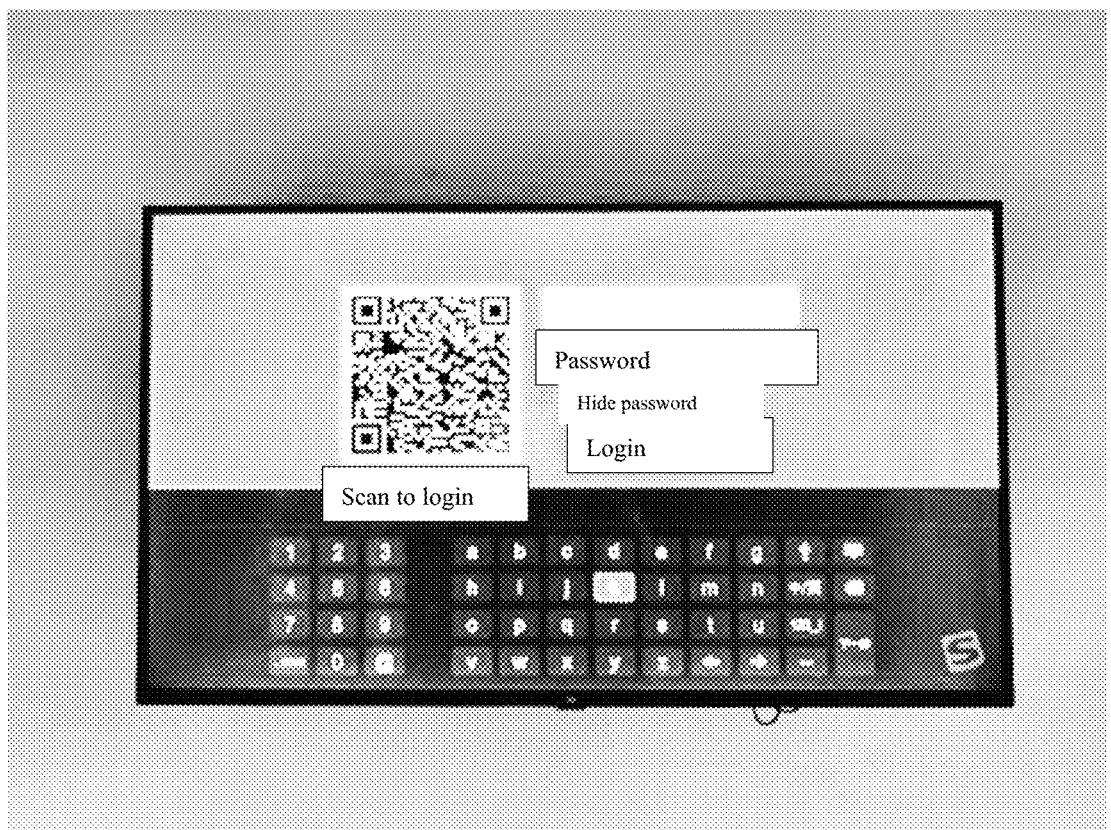
FIG. 1 is a schematic diagram showing an operation of inputting information to a television display interface according to some embodiments.

FIG. 1 is a schematic diagram showing an operation of inputting information to a television display interface according to some embodiments. In FIG. 1, if the user inputs in the input box of the display interface, the user needs to input letters one by one with the remote control, which is time-consuming and laborious, and the user's operation is not convenient.

Therefore, how to facilitate the user's input operation on the smart TV is an urgent problem to be solved.

Figure 2:
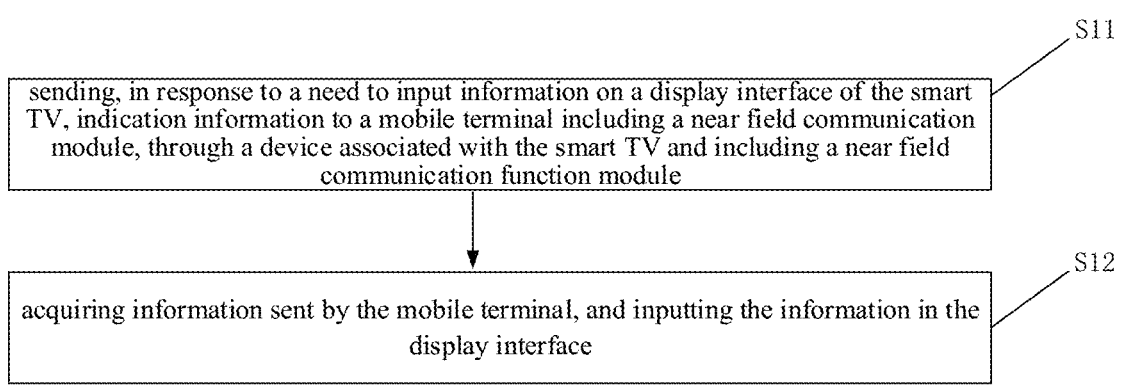
FIG. 2 is a flowchart showing a method for inputting information on a display interface according to some embodiments.

FIG. 2 is a flowchart showing a method for inputting information on a display interface according to some embodiments. As shown in FIG. 2, the method for inputting information on a display interface is used in a smart TV and includes the following steps.

In step S11, in response to a need to input information on the display interface of the smart TV, indication information is sent to a mobile terminal including a near field communication component, through a device associated with the smart TV and including a near field communication function circuit.

The smart TV involved in some embodiments of the present disclosure can be a TV that supports the near field communication function. In some embodiments of the present disclosure, a device including a near field communication function circuit can be, for example, a device including a near field communication (NFC) circuit. The device including the NFC circuit can be a TV remote control or a device including an NFC circuit connected to a smart TV.

When the user needs to input information to the smart TV, in response to the need to input information on the display interface of the smart TV, the indication information indicating that the information needs to be input in the display interface can be sent by the smart TV to the device including the NFC circuit, and the indication information is sent by the device including the NFC circuit to the mobile terminal including the NFC circuit.

Herein, prior to sending the indication information to the mobile terminal including the NFC circuit through the device including the NFC circuit, a prompt message for prompting the connection between the smart TV and the mobile terminal can be displayed on the display interface of the smart TV. The user can make the device including the NFC circuit and the mobile terminal including the NFC component touch each other based on the prompt information for connecting the smart TV and the mobile terminal, and thus a connection between the device including the NFC circuit and the mobile terminal is established in a touch mode. Furthermore, the indication information is sent by the device including the NFC circuit to the mobile terminal including the NFC component.

In some embodiments of the present disclosure, the indication information is used to indicate that information needs to be input in the display interface. In addition, when the information to be input in the display interface is uncertain, the indication information also includes information used to indicate to actuate a keyboard of the mobile terminal, and information used to indicate to connect the keyboard and the smart TV. The connection of the keyboard and the smart TV can be, for example, that the keyboard and the smart TV are connected based on a predetermined wireless connection. The predetermined wireless connection can include, for example, Bluetooth, Wi-Fi and other connection methods.

In step S12, information sent by the mobile terminal is acquired, and the information is input in the display interface.

In some embodiments of the present disclosure, when the connection between the device including the NFC circuit and the mobile terminal is established in the touch mode, the indication information used to indicate that information needs to be input in the display interface and to indicate to connect the keyboard and the smart TV is sent, by the device including the NFC circuit, to the mobile terminal, the keyboard of the mobile terminal is actuated by the mobile terminal based on the indication information, and the keyboard and the smart TV are connected based on the pre-configured wireless communication connection information. The user inputs the information entered on the keyboard into the display interface of the smart TV through the wireless communication method by using the keyboard of the mobile terminal that has been activated.

In some embodiments of the present disclosure, in response to the need to input information on the display interface of the smart TV, through the device that is associated with the smart TV and includes the near field communication function circuit, the indication information used to indicate that information needs to be input in the display interface is sent to the mobile terminal including the near field communication component, the information that needs to be input in the display interface of the smart TV can be input to the smart TV through the mobile terminal, which facilitates user operations and improves user experience.

Figure 3:
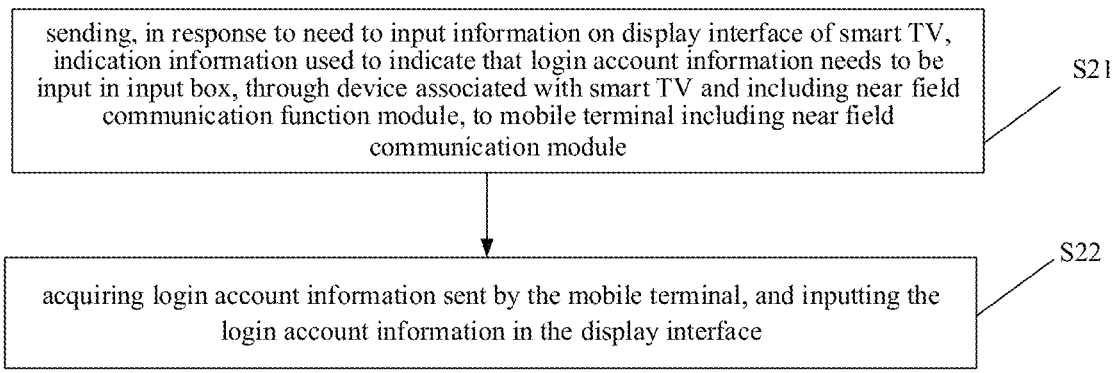
FIG. 3 is a flowchart showing a method for inputting information on a display interface according to some embodiments.

FIG. 3 is a flowchart showing a method for inputting information on a display interface according to some embodiments. As shown in FIG. 3, the method for inputting information on a display interface is used in a smart TV and includes the following steps.

In step S21, in response to the need to input information on the display interface of the smart TV, the indication information used to indicate that login account information needs to be input in the display interface is sent, through the device associated with the smart TV and including the near field communication function circuit, to the mobile terminal including the near field communication component.

In short-range wireless communication technology, since two devices must touch each other to transmit when NFC transmits data, using NFC is suitable for short-distance exchange of important data, and thus if the user inputs the login account information on the smart TV, in order to facilitate user input, the characteristics of NFC can be used to send the indication information used to indicate that the login account information needs to be input in the display interface to the mobile terminal including the NFC component, through the device associated with the smart TV and including the NFC circuit.

The login account information can include account name and password information of the designated application.

In step S22, the login account information sent by the mobile terminal is acquired, and the login account information is input in the display interface.

In some embodiments of the present disclosure, when connection between the device including the NFC circuit and the mobile terminal is established in a touch mode, indication information used to indicate that the login account information needs to be input in the display interface of the smart TV is sent, by the device including the NFC circuit, to the mobile terminal, if the designated application is in a login state at the mobile terminal or the designated application has logged in at the mobile terminal, the account information such as the login account, password and so on of the designated application is stored in the mobile terminal, when the connection between the device including the NFC circuit and the mobile terminal is established, the account information such as the login account, password and so on of the designated application is synchronized to the device including the NFC circuit by the NFC component in the mobile terminal, and then the account information such as the login account, password and so on of the designated application is sent by the device including the NFC circuit to the smart TV through wireless communication, such as Bluetooth or Wi-Fi, and the login account information is input in the display interface of the smart TV.

If the designated application is not in the login state at the mobile terminal or the designated application has not been logged in at the mobile terminal, the account information such as the login account, password and so on of the designated application is not stored in the mobile terminal, when the connection between the device including the NFC circuit and the mobile terminal is established, the login interface of the designated application can be actuated, and the keyboard of the mobile terminal can be actuated, by the mobile terminal, based on the indication information, and the keyboard is connected to the smart TV based on the pre-configured wireless communication connection information. The pre-configured wireless communication connection information can include, for example, Bluetooth or Wi-Fi. The user inputs the login account information on the login interface of the designated application by using the keyboard of the mobile terminal that has been activated, and the information entered on the keyboard can be input by the mobile terminal into the display interface of the smart TV in a wireless communication manner.

In some embodiments of the present disclosure, in response to the need to input information on the display interface of the smart TV, through the device that is associated with the smart TV and includes the near field communication function circuit, the indication information used to indicate that the login account information needs to be input in the display interface is sent to the mobile terminal including the near field communication component the login account information can be synchronized to the smart TV through the mobile terminal or the login account information that needs to be entered in the display interface of the smart TV can be input on the display interface of the smart TV through the mobile terminal, which is convenient for users to operate and improves the utilization rate of the smart TVs used by the users.

Figure 4:
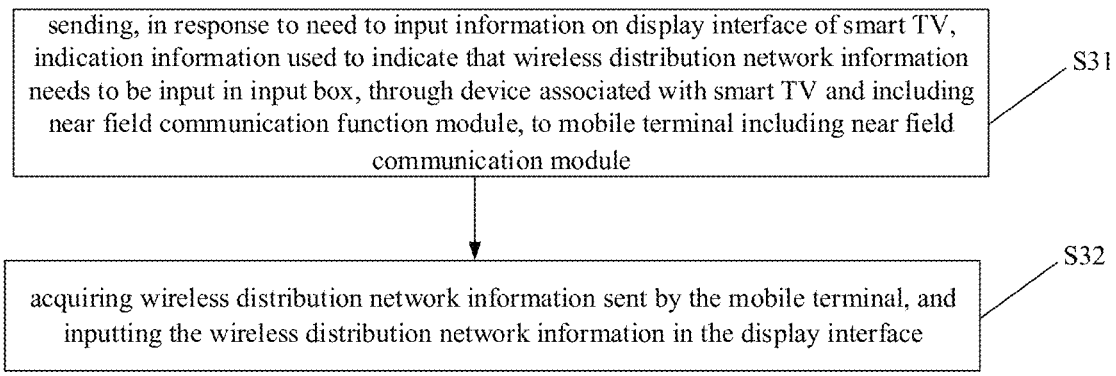
FIG. 4 is a flowchart showing a method for inputting information on a display interface according to some embodiments.

FIG. 4 is a flowchart showing a method for inputting information on a display interface according to some embodiments. As shown in FIG. 4, the method for inputting information on a display interface is used in a smart TV and includes the following steps.

In step S31, in response to the need to input information on the display interface of the smart TV, the indication information used to indicate that the wireless distribution network information needs to be input in the display interface is sent, through the device associated with the smart TV and including the near field communication function circuit, to the mobile terminal including the near field communication component.

Herein, the wireless distribution network information that needs to be input in the display interface can be the designated wireless distribution network name, password and other indication information, or the wireless distribution network indication information that does not specify the wireless distribution network name.

In step S32, the wireless distribution network information sent by the mobile terminal is acquired, and the wireless distribution network information is input in the display interface.

In some embodiments of the present disclosure, when the connection between the device including the NFC circuit and the mobile terminal is established in a touch mode, the indication information used to indicate that the wireless distribution network information needs to be input in the display interface is sent, by the device including the NFC circuit, to the mobile terminal. If the wireless distribution network information is the designated wireless distribution network name, password and other indication information, and it is consistent with the wireless distribution network information that the mobile terminal is connected, or the designated wireless distribution network name, password and other wireless distribution network information are stored in the mobile terminal, when the connection between the device including the NFC circuit and the mobile terminal is established, the designated wireless distribution network information is synchronized to the device including the NFC circuit through the NFC component in the mobile terminal, and then the designated wireless distribution network information is sent to the smart TV in a wireless communication manner, for example, via Bluetooth or Wi-Fi, by device including the NFC circuit and the wireless distribution network information is input in the display interface of the smart TV.

If the mobile terminal has not been configured with the information indicating the wireless distribution network sent by the device including the NFC circuit, when the connection between the device including the NFC circuit and the mobile terminal is established, a login interface of the wireless distribution network can be actuated, and the keyboard of the mobile terminal can be activated, by the mobile terminal, based on the indication information, and the keyboard is connected to the smart TV based on pre-configured wireless communication connection information. The pre-configured wireless communication connection information can include Bluetooth or Wi-Fi, for example. The user inputs the wireless distribution network information on the login interface of the wireless distribution network by using the keyboard of the mobile terminal that has been activated, and the information entered on the keyboard can be input into the display interface of the smart TV in a wireless communication manner.

In some embodiments of the present disclosure, in response to the need to input information on the display interface of the smart TV, through the device that is associated with the smart TV and includes the near field communication function circuit, the indication information used to indicate that the wireless distribution network information needs to be input in the display interface is sent to the mobile terminal including the near field communication component, the wireless distribution network information can be synchronized to the smart TV through the mobile terminal or the wireless distribution network information that needs to be entered in the display interface of the smart TV can be input on the display interface of the smart TV through the mobile terminal, which is convenient for users to operate and improves the utilization rate of the smart TVs used by the users.

Figure 5:
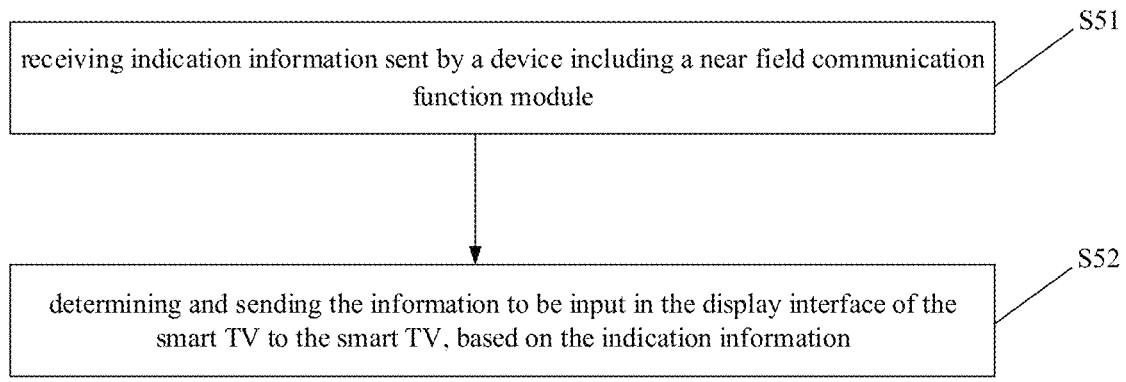
FIG. 5 is a flowchart showing a method for inputting information on a display interface according to some embodiments.

FIG. 5 is a flowchart showing a method for inputting information on a display interface according to some embodiments. As shown in FIG. 5, the method for inputting information on a display interface is used in a mobile terminal and includes the following steps.

In step S51, the indication information sent by the device including the near field communication function circuit is received.

In some embodiments of the present disclosure, after a connection between the mobile terminal including the near field communication component and the device including the near field communication function circuit is established, the indication information sent by the device including the near field communication function circuit can be received by the mobile terminal.

Herein, the device including the near field communication function circuit is associated with the smart TV. The mobile terminal including the near field communication component can be, for example, a mobile terminal including an NFC component. The indication information is used to indicate that information needs to be input in the display interface of the smart TV.

In step S52, based on the indication information, the information that needs to be input in the display interface of the smart TV is determined and sent to the smart TV.

In some embodiments of the present disclosure, the information that needs to be input in the display interface of the smart TV is determined, by the mobile terminal, based on the indication information, and the determined information that needs to be input in the display interface of the smart TV is sent to the smart TV.

Herein, the information that needs to be input in the display interface of the smart TV can be determined and sent by the mobile terminal in the following manner.

When the indication information is used to instruct to actuate the keyboard of the mobile terminal and to instruct to connect the keyboard to the smart TV, the keyboard is actuated by the mobile terminal based on the indication information, and a connection between the mobile terminal and the smart TV is establish based on the wireless communication manner, and the information input by the user through the keyboard is determined as the information that needs to be input in the display interface of the smart TV. The information entered on the keyboard by the user is sent to the smart TV in the wireless communication manner.

When the indication information is used to indicate that the login account information needs to be input in the display interface, it is determined by the mobile terminal whether the login account information of the designated application is stored. If the login account information has been stored in the mobile terminal, the stored login account information is determined as the information that needs to be input in the display interface of the smart TV, the designated wireless distribution network information is synchronized to the device including the NFC circuit through the NFC component in the mobile terminal, and then the designated login account information is sent to the smart TV by the device including the NFC circuit in a wireless communication manner, for example, via Bluetooth or Wi-Fi, and the wireless distribution network information is input in the display interface of the smart TV. If the login account information is not stored in the mobile terminal, the operation interface of the login account information of the mobile terminal is actuated, and the keyboard of the mobile terminal is actuated, by the mobile terminal, and the keyboard is connected to the smart TV based on the pre-configured wireless communication connection information. Herein, the pre-configured wireless communication connection information can include Bluetooth or Wi-Fi, for example. The user inputs the login account information on the login interface of the designated application by using the keyboard of the mobile terminal that has been activated, and the information entered on the keyboard can be input into the display interface of the smart TV in the wireless communication manner.

When the indication information is used to indicate that the wireless distribution network information needs to be input in the display interface, it is determined by the mobile terminal whether the wireless distribution network information is stored. If the wireless distribution network information has been stored in the mobile terminal, the stored wireless network information is determined as the information that needs to be input in the display interface of the smart TV. The designated wireless distribution network information is synchronized to the device including the NFC circuit through the NFC component in the mobile terminal, and then the designated wireless distribution network information is sent to the smart TV by the device including the NFC circuit in a wireless communication manner, for example, via Bluetooth or Wi-Fi, and the wireless distribution network information is input in the display interface of the smart TV. If the wireless network information is not stored in the mobile terminal, the login interface of the wireless distribution network is actuated, and the keyboard of the mobile terminal is actuated, by the mobile terminal, and the keyboard is connected to the smart TV based on the pre-configured wireless communication connection information. The pre-configured wireless communication connection information can include Bluetooth or Wi-Fi, for example. The wireless distribution network information input on the login interface of the wireless distribution network, by the user, by using the keyboard of the mobile terminal that has been activated is determined as the information that needs to be input in the display interface of the smart TV. The information entered on the keyboard is input into the display interface of the smart TV, by the mobile terminal, in the wireless communication manner.

In some embodiments of the present disclosure, when the mobile terminal receives the indication information sent by the smart TV through the device including the near field communication function circuit, the mobile terminal determines and sends the information that needs to be input in the display interface of the smart TV to the smart TV, which is convenient for users to operate the smart TV and improves the user experience.

Based on the same inventive concept, the present disclosure also provides an apparatus for inputting information on a display interface.

It can be understood that, in order to implement the above-mentioned functions, the application control apparatus provided by the embodiments of the present disclosure includes corresponding hardware structures and/or software modules to perform respective functions. In combination with the units and algorithm steps of the respective examples disclosed in the embodiments of the present disclosure, the embodiments of the present disclosure can be implemented in the form of hardware or a combination of hardware and computer software. Whether a function is executed by hardware or computer software-driven hardware depends on the specific application and design constraints of the technical solution. Those skilled in the art can use different methods for each specific application to implement the described functions, but such implementation should not be considered as going beyond the scope of the technical solutions of the embodiments of the present disclosure.

Figure 6:
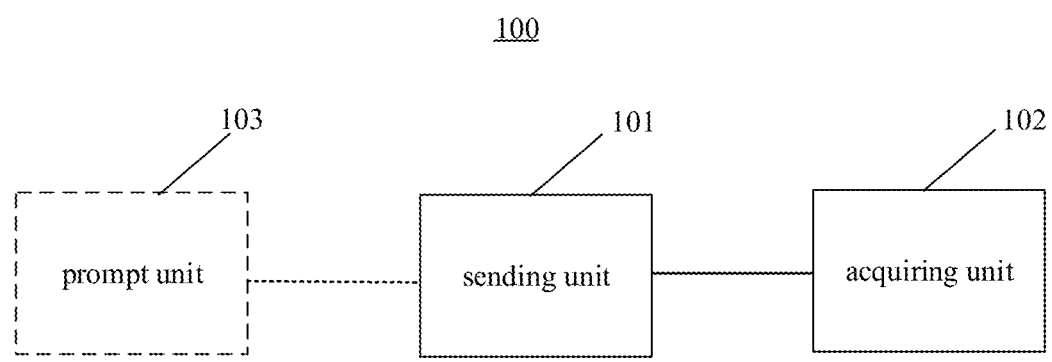
FIG. 6 is a block diagram showing an apparatus for inputting information on a display interface according to some embodiments.

FIG. 6 is a block diagram 100 showing an apparatus for inputting information on a display interface according to some embodiments. Referring to FIG. 6, the apparatus for inputting information on the display interface is applied to a smart TV, and the apparatus for inputting information on the display interface includes a sending unit 101 and an acquiring unit 102.

Herein, the sending unit 101 is configured to send, in response to a need to input information on the display interface of the smart TV, indication information to a mobile terminal including a near field communication component, through a device associated with the smart TV and including a near field communication function circuit, the indication information being used to indicate that the information needs to be input in the display interface; and the acquiring unit 102 is configured to acquire the information sent by the mobile terminal, and input the information in the display interface.

In some embodiments, the apparatus for inputting information on the display interface further includes a prompting unit 103, and the prompting unit 103 is configured to, prior to sending the indication information to the mobile terminal including the near field communication component, display prompt information for prompting a connection between the smart TV and the mobile terminal, on the display interface of the smart TV.

In some embodiments, the sending unit 101 is configured to send the indication information to the mobile terminal including the near field communication component in the following manner: sending the indication information to the mobile terminal including the near field communication component, when a near field communication connection between the device including the near field communication function circuit and the mobile terminal is established in a touch mode.

In some embodiments, the indication information is used to indicate that at least one of login account information and wireless distribution network information needs to be input in the display interface.

In some embodiments, the indication information is further used to indicate to actuate a keyboard of the mobile terminal and to indicate to connect the mobile terminal and the smart TV.

In some embodiments, the acquiring unit 102 is configured to acquire the information sent by the mobile terminal in the following manner: acquiring the information sent by the mobile terminal through near field communication by the device including the near field communication function circuit, when a connection between the near field communication function circuit and the mobile terminal is established in a touch mode.

In some embodiments, the acquiring unit 102 is configured to acquire the information sent by the mobile terminal in the following manner: acquiring the information sent by the mobile terminal, when a connection between the keyboard and the smart TV is established in a wireless communication manner.

In some embodiments, the device includes a TV remote control.

With respect to the apparatus in the above embodiments, the specific implementations for performing operations by individual modules therein have been described in detail in the embodiments regarding the methods, which will not be elaborated herein.

Figure 7:
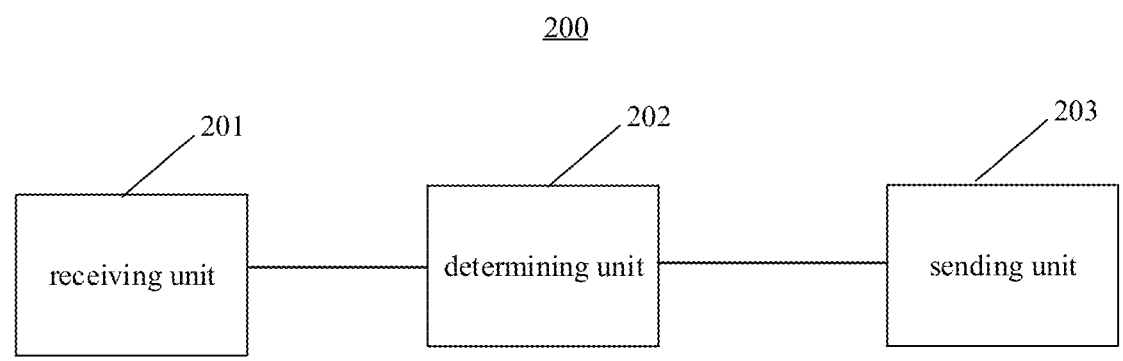
FIG. 7 is a block diagram showing an apparatus for inputting information on a display interface according to some embodiments.

FIG. 7 is a block diagram 200 showing an apparatus for inputting information on a display interface according to some embodiments. Referring to FIG. 7, the apparatus for inputting information on the display interface is applied to a mobile terminal including a near field communication component, and includes a receiving unit 201, a determining unit 202, and a sending unit 203.

Herein, the receiving unit 201 is configured to receive indication information sent by a device including a near field communication function circuit, the device including the near field communication function circuit is associated with a smart TV, and the indication information is used to indicate the need to input information in the display interface of the smart TV.

The determining unit 202 is configured to determine the information that needs to be input in the display interface of the smart TV based on the indication information; and the sending unit 203 is configured to send the information that needs to be input in the display interface of the smart TV to the smart TV.

In some embodiments, the indication information is used to indicate that the login account information and/or wireless distribution network information need to be input in the display interface; the determining unit 202 is configured to determine the information that needs to be input in the display interface of the smart TV in the following manner: determining, when the login account information and/or the wireless distribution network information are stored in the mobile terminal, the stored login account information and/or the wireless distribution network information as the information to be input in the display interface of the smart TV.

In some embodiments, the determining unit 202 is configured to determine the information to be input in the display interface of the smart TV in the following manner: actuating an operation interface of the login account information of the mobile terminal, when the login account information is not stored in the mobile terminal, and determining information input by a user on the operation interface of the login account information as the information to be input in the display interface of the smart TV; and/or actuating the operation interface of the wireless distribution network information of the mobile terminal, when the wireless distribution network information is not stored in the mobile terminal, and determining the information input by the user on the operation interface of the wireless distribution network information as the information to be input in the display interface of the smart TV.

In some embodiments, the indication information is also used to indicate to actuate a keyboard of the mobile terminal and to indicate to connect the mobile terminal and the smart TV; and the determining unit 202 is configured to determine the information to be input in the display interface of the smart TV in the following manner: actuating the keyboard, based on the indication information; and determining the information input by the user through the keyboard as the information to be input in the display interface of the smart TV.

In some embodiments, the sending unit 203 is configured to send the information to be input to the smart TV in the following manner: sending, when a near field communication connection between the near field communication function circuit and the mobile terminal is established in a touch mode, the information to be input to the smart TV, by the mobile terminal, through the device including the near field communication function circuit.

In some embodiments, the sending unit 203 is configured to send the information to be input to the smart TV in the following manner: sending, when a connection between the keyboard and the smart TV is established in a wireless communication manner, the information input by the user through the keyboard to the smart TV in a wireless communication manner.

Figure 8:
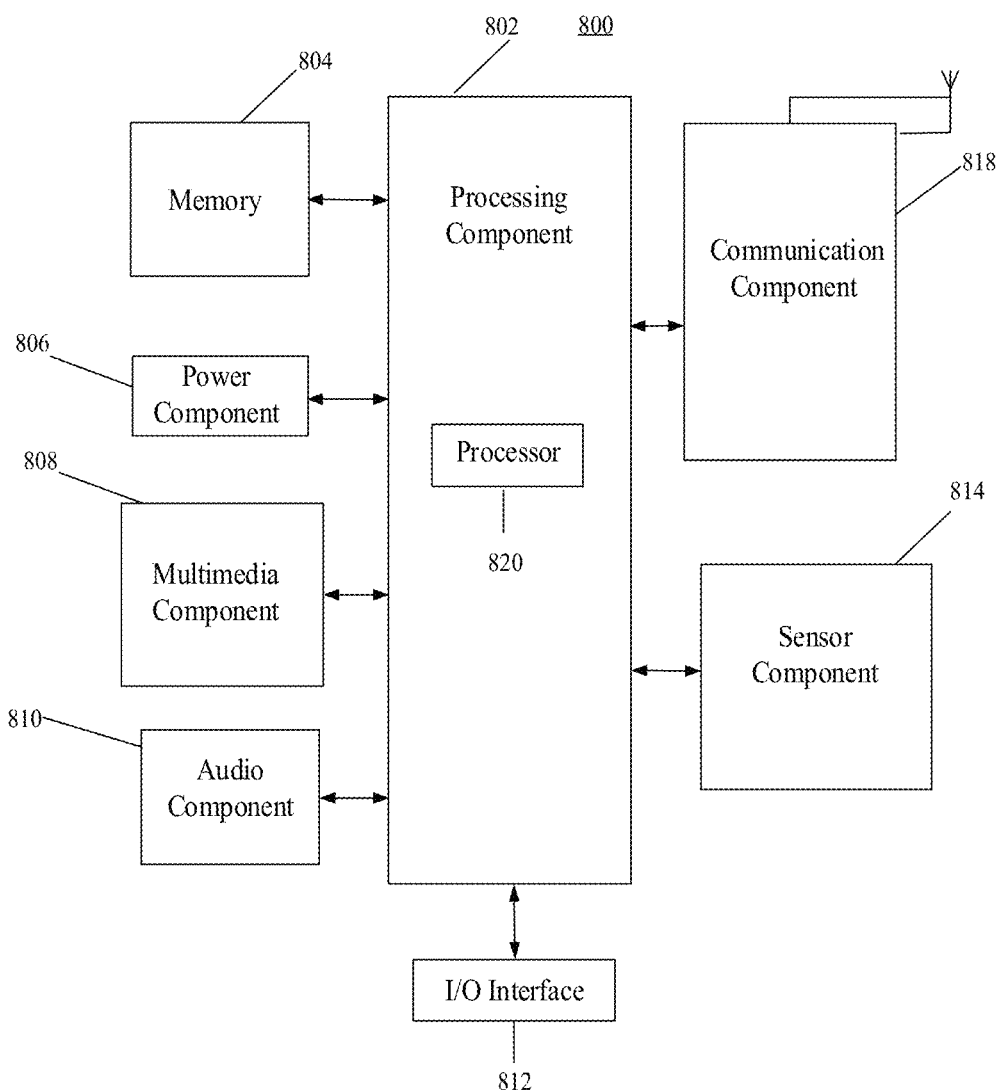
FIG. 8 is a block diagram showing a device according to some embodiments.

FIG. 8 is a block diagram showing a device 800 for inputting information on a display interface according to some embodiments. For example, the device 800 can be a mobile phone, a computer, a digital broadcast terminal, a messaging device, a gaming console, a tablet, a medical device, exercise equipment, a personal digital assistant, and the like.

Referring to FIG. 8, the device 800 can include one or more of the following components: a processing component 802, a memory 804, a power component 806, a multimedia component 808, an audio component 810, an input/output (I/O) interface 812, a sensor component 814, and a communication component 818.

The processing component 802 typically controls overall operations of the device 800, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 can include a power management system, one or more power sources, and any other components associated with the generation, management, and distribution of power in the device 800.

The multimedia component 808 includes a screen providing an output interface between the device 800 and the user. In some embodiments, the screen can include a liquid crystal display (LCD) and a touch panel (TP). In some implementations, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensors not only can sense a boundary of a touch or swipe action, but also can sense a period of time and a pressure associated with the touch or swipe action. In some embodiments, the multimedia component 808 includes a front camera and/or a rear camera. The front camera and/or the rear camera can receive an external multimedia datum while the device 800 is in an operation mode, such as a photographing mode or a video mode. Each of the front camera and the rear camera can be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal can be further stored in the memory 804 or transmitted via the communication component 818. In some embodiments, the audio component 810 further includes a speaker to output audio signals.

The I/O interface 812 provides an interface between the processing component 802 and peripheral interface modules, such as a keyboard, a click wheel, buttons, and the like. The buttons can include, but are not limited to, a home button, a volume button, a starting button, and a locking button.

The sensor component 814 includes one or more sensors to provide status assessments of various aspects of the device 800. For instance, the sensor component 814 can detect an open/closed status of the device 800, relative positioning of components such as the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 818 is configured to facilitate wired or wireless communication between the device 800 and other devices. The device 800 can access a wireless network based on a communication standard, such as Wi-Fi, 2G, 3G, 4G, 5G, or a combination thereof. In one exemplary embodiment, the communication component 818 receives a broadcast signal or broadcast associated information from an external broadcast management system via a broadcast channel. In one exemplary embodiment, the communication component 818 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 800 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above described methods. For example, the non-transitory computer-readable storage medium can be a ROM, a random access memory (RAM), a CD-ROM, a magnetic tape, a floppy disc, an optical data storage device, and the like.

Various embodiments of the present disclosure can have the following advantages: in response to the need to input information on the display interface of the smart TV, through the device associated with the smart TV and including a near field communication function circuit, indication information configured to indicate the need to enter information in the input box is sent to the mobile terminal including the near field communication component, and the information to be input in the display interface of the smart TV can be input to the smart TV through the mobile terminal, which facilitates user operations and improves user experience.

The various devices, apparatus, smart TVs, and mobile terminals can be part of a smart home system, in which multiple devices and components can be connected to a network, and can be controlled through one or more mobile terminals.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms In some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for inputting information on a display interface, the method being applied to a smart TV, and comprising:
    sending, in response to a need to input information on the display interface of the smart TV, indication information to a mobile terminal including a near field communication component, through a device associated with the smart TV and including a near field communication function circuit, the indication information being configured to indicate that information needs to be input in the display interface, indicate to actuate a keyboard of the mobile terminal, and indicate to connect the mobile terminal and the smart TV;
    connecting the mobile terminal and the smart TV based on pre-configured wireless communication connection information; and
    acquiring information sent by the mobile terminal, and inputting the information entered on the keyboard into the display interface of the smart TV through the wireless communication method by using the keyboard of the mobile terminal that has been activated.

2. The method for inputting information on the display interface according to claim 1, wherein prior to said sending the indication information to the mobile terminal, the method further comprises:
    displaying, on the display interface of the smart TV, prompt information for prompting a connection between the smart TV and the mobile terminal.

3. The method for inputting information on the display interface according to claim 1, wherein said sending indication information to the mobile terminal comprises:
    sending the indication information to the mobile terminal, when a near field communication connection between the device and the mobile terminal is established in a touch mode.

4. The method for inputting information on the display interface according to claim 3, wherein the indication information is configured to indicate that at least one of login account information and wireless distribution network information needs to be input in the display interface.

5. The method for inputting information on the display interface according to claim 1, wherein said acquiring information sent by the mobile terminal comprises:
    acquiring the information sent by the mobile terminal through the near field communication function circuit of the device, when a connection between the near field communication function circuit of the device and the mobile terminal is established in a touch mode.

6. The method for inputting information on the display interface according to claim 1, wherein said acquiring information sent by the mobile terminal comprises:
    acquiring the information input through the keyboard and sent, by the mobile terminal, when a connection between the keyboard and the smart TV is established in a wireless communication manner.

7. The method for inputting information on the display interface according to claim 1, wherein the device comprises a TV remote control.

8. A method for inputting information on a display interface, the method being applied to a mobile terminal including a near field communication component, and comprising:
receiving indication information sent by a device including a near field communication function circuit, the device being associated with a smart TV, and the indication information being configured to indicate that information needs to be input in a display interface of the smart TV, indicate to actuate a keyboard of the mobile terminal, and indicate to connect the mobile terminal and the smart TV based on pre-configured wireless communication connection information;
actuating the keyboard of the mobile terminal based on the indication information; and
determining and sending the information entered on the keyboard that has been activated, which needs to be input in the display interface of the smart TV to the smart TV, based on the indication information.

9. The method for inputting information on the display interface according to claim 8, wherein the indication information is configured to indicate that login account information and/or wireless distribution network information need to be input in the display interface; and
said determining the information to be input in the display interface of the smart TV comprises:
determining, when the login account information and/or the wireless distribution network information are stored in the mobile terminal, the stored login account information and/or wireless distribution network information as the information to be input in the display interface of the smart TV.

10. The method for inputting information on the display interface according to claim 9, wherein said determining the information to be input in the display interface of the smart TV comprises at least one of:
actuating, when the login account information is not stored in the mobile terminal, an operation interface of the login account information of the mobile terminal, and determining information input by a user to the operation interface of the login account information as the information to be input in the display interface of the smart TV; and
actuating, when the wireless distribution network information is not stored in the mobile terminal, the operation interface of the wireless distribution network information of the mobile terminal, and determining the information input by the user to the operation interface of the wireless distribution network information as the information to be input in the display interface of the smart TV.

11. The method for inputting information on the display interface according to claim 10, wherein
said determining the information to be input in the display interface of the smart TV comprises:
determining the information input by the user through the keyboard as the information to be input in the display interface of the smart TV.

12. The method for inputting information on the display interface according to claim 9, wherein said sending the information to be input to the smart TV comprises:
sending, when a near field communication connection between the near field communication function circuit of the device and the mobile terminal is established in a touch mode, the information to be input to the smart TV, by the mobile terminal, through the device including the near field communication function circuit.

13. The method for inputting information on the display interface according to claim 11, wherein said sending the information to be input to the smart TV comprises:
sending, when a connection between the keyboard and the smart TV is established in a wireless communication manner, the information input by the user through the keyboard to the smart TV in a wireless communication manner.

14. An apparatus for inputting information on the display interface implementing the method according to claim 1, comprising:
memory for storing processor-executable instructions;
a processor configured to execute the processor-executable instructions to implement steps of the method.

15. The apparatus for inputting information on the display interface according to claim 14, wherein the processor is further configured to, prior to said sending the indication information to the mobile terminal including the near field communication component, display prompt information for prompting a connection between the smart TV and the mobile terminal, on the display interface of the smart TV.

16. A non-transitory computer-readable storage medium having stored thereon computer-executable instructions for execution by a processor to perform operations of the method for inputting information in the input box according to claim 1.

17. An apparatus for inputting information on the display interface implementing the method according to claim 8, comprising:
memory storing processor-executable instructions;
a processor configured to execute the processor-executable instructions to implement steps of the method.

18. The apparatus for inputting information on the display interface according to claim 17, wherein the indication information is configured to indicate that login account information and/or wireless distribution network information need to be input in the display interface; and
the processor is further configured to determine, when the login account information and/or the wireless distribution network information are stored in the mobile terminal, the stored login account information and/or wireless distribution network information as the information to be input in the display interface of the smart TV.

19. A non-transitory computer-readable storage medium having stored thereon computer-executable instructions for execution by a processor to implement the method for inputting information on the display interface according to claim 8.

* * * * *